(12) United States Patent
Medalion et al.

(10) Patent No.: US 11,127,403 B2
(45) Date of Patent: Sep. 21, 2021

(54) MACHINE LEARNING-BASED AUTOMATIC DETECTION AND REMOVAL OF PERSONALLY IDENTIFIABLE INFORMATION

(71) Applicant: INTUIT INC., Mountain View, CA (US)

(72) Inventors: Shlomi Medalion, Lod (IL); Liron Hayman, Jerusalem (IL); Alexander Zhicharevich, Petah Tikva (IL); Liat Ben Porat Roda, Tel-Aviv (IL)

(73) Assignee: INTUIT INC., Mountain View, CA (US)

( * ) Notice: Subject to any disclaimer, the term of this patent is extended or adjusted under 35 U.S.C. 154(b) by 237 days.

(21) Appl. No.: 16/664,480

(22) Filed: Oct. 25, 2019

(65) Prior Publication Data
US 2021/0125615 A1    Apr. 29, 2021

(51) Int. Cl.
| | | |
|---|---|---|
| *G10L 15/00* | (2013.01) | |
| *G10L 15/26* | (2006.01) | |
| *G10L 15/18* | (2013.01) | |
| *G10L 15/16* | (2006.01) | |
| *G06N 3/04* | (2006.01) | |
| *G06F 21/62* | (2013.01) | |
| *G06K 9/62* | (2006.01) | |
| *G06F 40/30* | (2020.01) | |
| *G06F 40/295* | (2020.01) | |

(52) U.S. Cl.
CPC .......... *G10L 15/26* (2013.01); *G06F 21/6245* (2013.01); *G06F 40/295* (2020.01); *G06F 40/30* (2020.01); *G06K 9/6256* (2013.01); *G06N 3/0454* (2013.01); *G10L 15/16* (2013.01); *G10L 15/1815* (2013.01)

(58) Field of Classification Search
None
See application file for complete search history.

(56) References Cited

U.S. PATENT DOCUMENTS

| | | | |
|---|---|---|---|
| 10,388,272 B1 * | 8/2019 | Thomson | G10L 15/063 |
| 10,445,431 B1 * | 10/2019 | Lev-Tov | G06N 3/08 |
| 2019/0311227 A1 * | 10/2019 | Kriegman | G06K 9/00442 |

* cited by examiner

*Primary Examiner* — Satwant K Singh
(74) *Attorney, Agent, or Firm* — Patterson + Sheridan LLP (57) ABSTRACT

Certain aspects of the present disclosure provide techniques for detecting personally identifiable information, including: receiving a plurality of text strings, each text string of the plurality of text strings associated with a user support session; providing the plurality of text strings to one or more bidirectional long short-term memory (BiLSTM) neural network models; receiving output from the one or more BiLSTM neural network models, the output indicating one or more text data elements in the plurality of text strings comprising predicted personally identifiable information; redacting the one or more text data elements comprising the predicted personally identifiable information from the plurality of text strings to form redacted text strings; and providing, to a data repository, the redacted text strings.

20 Claims, 5 Drawing Sheets

MACHINE LEARNING-BASED AUTOMATIC DETECTION AND REMOVAL OF PERSONALLY IDENTIFIABLE INFORMATION

INTRODUCTION

Aspects of the present disclosure relate to machine learning-based automatic detection and removal of personally identifiable information.

In the age of "big data", organizations of all sorts are finding creative ways to collect and use digital data related to individuals in order to offer improved goods and services to those individuals. At the same time, global privacy regulations are becoming stricter in how such data can be collected and used. For example, the European Union has implemented the General Data Protection Regulation (GDPR) and California has approved and is set to implement the California Consumer Privacy Act. These are just a few examples, and others are sure to follow. Common to most data protection frameworks, such as GDPR and CCPA, are rules regarding the collection and use of personally identifiable information (PII), which is generally any data that can potentially identify a specific individual.

Collection of PII by organizations may be intentional or incidental as part of providing goods and services. For example, a user may disclose some PII as part of a support call to resolve an issue with a good or service provided by an organization, such as a software application. Telephone recordings and transcripts from such support calls may subsequently be used to train employees, to train models for machine learning tasks, etc. In such cases, though, the PII included in the recordings and transcripts may not be "targeted" for collection, and indeed may not even be useful for subsequent business purposes, such as training. However, such incidental collection of PII is nevertheless subject to privacy regulations, and thus must be proactively dealt with by the organization collecting it.

Removal of PII from collected data is challenging, especially where the data is unstructured. Conventional methods for expunging such data often include a manual component. For example, an organization may use human inspectors to review collected data and flag and/or delete any PII. Not surprisingly, such manual methods, while effective, incur significant time and cost.

Automated methods for removing PII from collected data have so far proven largely ineffective at identifying and removing PII due to the complexity of the task. Moreover, because many privacy regulations include punitive provisions for mishandling PII, the ineffectiveness of existing automated solution has led to an avoidance of such solutions to avoid liability under the regulations. An organization cannot escape liability for mishandling PII simply because its automated solution proves ineffective.

Accordingly, what is needed are improved systems and methods for automatic detection and removal of PII.

BRIEF SUMMARY

Certain embodiments provide a method for detecting personally identifiable information, including: receiving a plurality of text strings, each text string of the plurality of text strings associated with a user support session; providing the plurality of text strings to one or more bidirectional long short-term memory (BiLSTM) neural network models; receiving output from the one or more BiLSTM neural network models, the output indicating one or more text data elements in the plurality of text strings comprising predicted personally identifiable information; redacting the one or more text data elements comprising the predicted personally identifiable information from the plurality of text strings to form redacted text strings; and providing, to a data repository, the redacted text strings.

Further embodiments provide a processing system, comprising: a memory comprising computer-executable instructions; a processor configured to execute the computer-executable instructions and cause the processing system to: receive a plurality of text strings, each text string of the plurality of text strings associated with a user support session; provide the plurality of text strings to one or more bidirectional long short-term memory (BiLSTM) neural network models; receive output from the one or more BiLSTM neural network models, the output indicating one or more text data elements in the plurality of text strings comprising predicted personally identifiable information; redact the one or more text data elements comprising the predicted personally identifiable information from the plurality of text strings to form redacted text strings; and provide, to a data repository, the redacted text strings.

A non-transitory computer-readable medium comprising computer-executable instructions, which, when executed by a processing system, cause the processing system to perform a method for detecting personally identifiable information, the method comprising: receiving a plurality of text strings, each text string of the plurality of text strings associated with a user support session; providing the plurality of text strings to one or more bidirectional long short-term memory (BiLSTM) neural network models; receiving output from the one or more BiLSTM neural network models, the output indicating one or more text data elements in the plurality of text strings comprising predicted personally identifiable information; redacting the one or more text data elements comprising the predicted personally identifiable information from the plurality of text strings to form redacted text strings; and providing, to a data repository, the redacted text strings.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for automatic detection and removal of personally identifiable information (PII).

Personally Identifiable Information

Generally, PII is any data that can potentially identify a specific individual. PII may be further defined as "sensitive" or "non-sensitive".

Sensitive PII is generally information about an individual which, when disclosed, could result in harm to that individual. Sensitive PII includes, for example, biometric information, medical information, personally identifiable financial information (PIFI) and unique identifiers, such as: passport number, driver's license number, Social Security number, and the like. Because of its sensitivity, sensitive PII may generally be encrypted in transit and when at rest.

Non-sensitive PII is information is generally information about an individual that may be gathered from public records, phone books, corporate directories, websites, and other public information repositories. Thus, non-sensitive PII is generally not harmful to an individual if disclosed, but such disclosure may nevertheless be prohibited by privacy regulations. Because of its non-sensitivity, non-sensitive PII may sometimes be transmitted and stored in an unencrypted form.

Brief Overview of Machine Learning

The systems and methods described herein utilize machine learning to automate the detection and removal of PII from data collected by an organization.

Machine learning is generally an application of artificial intelligence (AI) that enables processing systems to automatically learn and improve from exposure to data without being explicitly programmed. The process of "learning" relies on processing data (e.g., "observations") with machine learning algorithms to find, for example, patterns that may be otherwise undiscernible by normal inspection. Machine learning algorithms thus allow processing systems to learn without human intervention or assistance. Machine learning algorithms are often categorized as supervised or unsupervised.

Supervised machine learning algorithms generally analyze training data with known target or output values (e.g., labels) in order to determine a function that may be subsequently used to make predictions (or "inferences") based on new, unlabeled data. To learn, such algorithms may compare the predicted output of the predictive function with the known output of training data to evolve the predictive function in such a way that prediction error is eventually minimized.

Unsupervised machine learning algorithms generally analyze training data without labels. Thus, unsupervised learning generally determines a function to describe latent structure in unlabeled training data. For example, unsupervised machine learning algorithms may generate clusters of data, decision boundaries between subsets of data, and the like.

Semi-supervised machine learning algorithms generally use both labeled and unlabeled data for training, which may typically involve a relatively smaller amount of labeled data and a relatively larger amount of unlabeled data. The labeled data generally improves learning accuracy as compared to unsupervised technique.

Reinforcement machine learning algorithms generally involves interacting with a specific environment through "actions" and discovering errors or rewards through those interactions. Reinforcement algorithms thus allow processing systems to automatically determine an ideal behavior within a specific context in order to maximize its performance. Feedback, which may be considered a reinforcement signal, is generally required for the reinforcement algorithms to learn which action is best.

Machine learning thus enables analysis of large quantities of data to generate models for myriad purposes. The embodiments described herein generally refer to supervised learning techniques, but other machine learning techniques may be possible in other embodiments.

Using Machine Learning to Automatically Detect and Remove PII

Conventional "automated" methods for detecting PII in data are primarily based on pattern matching, such as by use of regular expressions. A regular expression, regex, or regexp is generally a sequence of characters that define a search pattern, which may be used by string searching algorithms to find or to find and replace the pattern in data.

Regular expressions are rigid in their application and consequently cause a variety of problems when applied to detection and removal of PII, especially in unstructured data. For example, regular expressions often miss PII when it does not conform to a strictly defined pattern. Consider a transcript of a call in which a user provides a social security number as follows: "my social security number is 12346, I mean, 456789". The intervening text in the middle of the social security number breaks the pattern expected by the regular expression and thus the PII is not identified by the expression.

Further, regular expressions may match patterns where the underlying data is not actually PII. For example, a transcript of another call may read: "the model number of the product I'm having an issue with is 123456789." Here, the model number may be detected and deleted as suspected PII (e.g., a social security number), when in fact it is not PII, it merely matches a pattern of PII. In such cases, otherwise useful data may be deleted, which reduces the usefulness of the remaining data for other business purposes, such as training, building models, etc. Testing of conventional methods has shown that as much as 70% of test cases (e.g., transcripts of support calls) include automated redactions, and only 2% of the test cases actually needed redactions. In other words, conventional methods delete significant amounts of otherwise useful data that need not be deleted based on any PII regulation.

Generally, then, regular expressions are both rigid, causing many false negatives (i.e., failures to detect and remove PII), and not context aware, causing many false positives (i.e., misdetection and removal of non-PII). These shortcomings have prevented conventional automated methods based on regular expressions from being a tenable PII handling solution for organizations.

By contrast, the systems and methods described herein use machine learning to generate models that are more flexible than conventional methods and which utilize context awareness to further improve performance compared to conventional methods.

More specifically, embodiments described herein utilize recurrent neural network machine learning architectures, such as bidirectional long short-term memory (BiLSTM) neural network models. The BiLSTM neural network models described herein are trained on labelled datasets including PII to identify the PII both directly and by context, which mitigates the rigidness of existing pattern-based techniques, such as regular expressions.

BiLSTM neural networks utilize deep learning and feedback connections, unlike standard feedforward neural networks (which only pass data one direction through the layers), which makes them particularly well-suited to analyzing unstructured data for PII. Specifically, the feedback connections in BiLSTM neural networks allow for processing single data points (e.g., a single term in a sentence) as well as sequences of data (e.g., the whole sentence and/or terms surrounding a target term). BiLSTM models are thus well-suited to classifying, processing, and making predictions based on sequential data, such as text, spoken words, time-series, and the like.

Embodiments described herein utilize BiLSTM neural network models configured through training to make multifaceted predictions to improve performance. For example, the BiLSTM neural network models may be configured to predict: (1) whether a string of text (e.g., a sentence in a transcript) contains PII by looking at the full sentence; (2) whether a specific term (or token) contains PII based on the context of the term; and (3) whether the specific term contains PII based on the term itself. Each facet of the multi-faceted prediction architecture may then be combined into a single loss function, which improves the efficiency of training and optimization of such models.

Further, specific training strategies may be implemented with the BiLSTM neural network models described herein to further improve performance. For example, during initial model training, weighting of the three aforementioned prediction types (e.g., via trainable hyperparameters) may be biased for better generalization to improve detection of PII from context. This may be done, for example, by increasing the weighting hyperparameter for the context-based prediction (2, above) during training. Then, when making life predictions (or inferences) based on new, unseen data, the model weighting parameters may be changed to give more bias or priority to the term-level prediction (3, above). Notably, these are just some examples, and other configurations are possible.

Example Context for Automatic Detection and Removal of PII

The systems and methods for automatic detection and removal of PII described herein may be used in many different contexts, but in order to provide a consistent example for discussion throughout, an example context based on a transcribed support call is now described.

An organization may offer support channels that customers may use for support relating to the organization's goods and services. Often such support channels include phone-based support and, increasingly, live text-based chat support. As is standard in many industries, the phone-base support lines may be recorded and transcribed for later use by the organization, such as for a training tool, for training various sorts of models, and for other reasons. The recordings of the support calls, associated transcripts, and text-based chat transcripts may be saved in one or more data repositories maintained by the organization, including local data repositories, remote data repositories, and cloud-based data repositories, to name a few options.

In one example, a transcript of a telephone-based support call between an agent of an organization and a customer, user, or the like, may be as follows:

TABLE 1

Example Transcript of Telephone-Based Support Call

| Speaker | Text String |
|---|---|
| Agent: | "Can I please have your Social Security Number?" |
| Customer: | "Sure. My SSN is 1234 oh kids please be quiet 56780 I mean 9." |

In the example of Table 1, several of the difficulties of identifying PII with regular expressions and pattern matching are demonstrated. For example, a social security pattern of ###-##-#### or even ######### would not match the multi-part form in which the customer's actual social security number (123-45-6789) is provided. In particular, the intervening text ("oh kids please be quiet") and the fact that the customer made an error and corrected it ("0 I mean 9") create several opportunities for regular expression or pattern matching failures. Thus, it would be very likely that this PII is not automatically detected and removed by conventional automated methods.

The example transcript in Table 1 may be used to generate training data for a machine learning-based model, such as those described herein. For example, each text string (e.g., a sentence, phrase, utterance, statement, or the like) may be labeled based on whether PII exists in the text string, such as in Table 2:

TABLE 2

Example Transcript of Telephone-Based Support Call with PII Labels

| Speaker | Text String | PII Present? |
|---|---|---|
| Agent: | "Can I please have your Social Security Number?" | FALSE |
| Customer: | "Sure. My SSN is 1234 oh kids please be quiet 56780 I mean 9." | TRUE |

As in Table 2, a Boolean value (e.g., true or false) may be applied to the label regarding PII presence. In other examples, a count of potential PII terms or the like may be used.

To generate even more training data, variations of PII redactions may be introduced to enable a model to learn when the right text was redacted versus when the wrong text was redacted, such as in Table 3:

TABLE 3

Example Transcript of Telephone-Based Support Call with PII Labels

| Sample | Text String | PII Present? | PII Redacted? |
|---|---|---|---|
| 1 | "Can I please have your XXXXX?" | FALSE | FALSE |
| 2 | "Sure. My SSN is 1234 XXXXX be quiet 56780 I mean 9." | TRUE | FALSE |
| 3 | "Sure. My SSN is XXXXX oh kids please be quiet 56780 I mean 9." | TRUE | TRUE |
| 4 | "Sure. My SSN is 1234 oh kids please be quiet XXXXX I mean 9." | TRUE | TRUE |

For example, in Sample 1, the text "social security number" has been redacted, but this was not PII (thus the "FALSE" in the PII Redacted?" column) and PII was not present in the text string (thus the "FALSE" in the PII Present?" column). As another example, in Sample 2, the text "oh kids please" has been redacted, which is not PII (thus the "FALSE" in the PII Redacted?" column), but PII was present in the text string (thus the "TRUE" in the PII Present?" column). As yet another example, in Sample 3, the text "1234" has been redacted, which is PII (thus the "TRUE" in the PII Redacted?" column), and PII was present in the text string (thus the "TRUE" in the PII Present?" column). Similarly, in Sample 4, the text "56780" has been redacted, which is PII (thus the "TRUE" in the PII Redacted?" column), and again PII was present in the text string (thus the "TRUE" in the PII Present?" column).

The redactions in the various samples in Table 3 may be generated manually by human inspection, or with other automated or semi-automated methods and that are then verified by humans. Notably, in the example of Table 3, there are positive results for "PII Redacted" so long as some part of the PII is redacted. In other embodiments, the positive results may be limited to situations in which all of the PII was redacted. However, the example in Table 3 may improve a model's ability to detect partial strings of PII in a sample, and thus increase the flexibility of the automated detection and removal of such PII.

In some embodiments, labels may be applied to concatenated text strings, or text string pairs (e.g., question and answer pairs), such as an agent's question followed by a customer's answer, as shown in Table 4:

TABLE 4

Example Transcript of Telephone-Based Support Call with PII Labels

| Sample | Text String | PII Present? | PII Redacted? |
|---|---|---|---|
| 1 | "Can I please have your Social Security Number?" | FALSE | FALSE |
| 2 | Sure, give me a minute to look it up" "Can I please have your Social Security Number? Sure. My SSN is 1234 XXXXX be quiet 56780 I mean 9." | TRUE | FALSE |
| 3 | "Can I please have your Social Security Number? Sure. My SSN is XXXXX oh kids please be quiet 56780 I mean 9." | TRUE | TRUE |
| 4 | "Can I please have your Social Security Number? Sure. My SSN is 1234 oh kids please be quiet XXXXX I mean 9." | TRUE | TRUE |

Generating test data samples in this manner may improve the context learning during model training because, as in this example, the agent's question ("Can I please have your Social Security Number?") provides explicit context for the numbers provided in response by the customer ("my SSN is 1234 oh kids please be quiet 56780 I mean 9").

Notably, this is just one example of a specific context and different manners of generating training data based on that context, and many other examples are possible.

Example Machine Learning-Based PII Detection and Removal System

Figure 1:
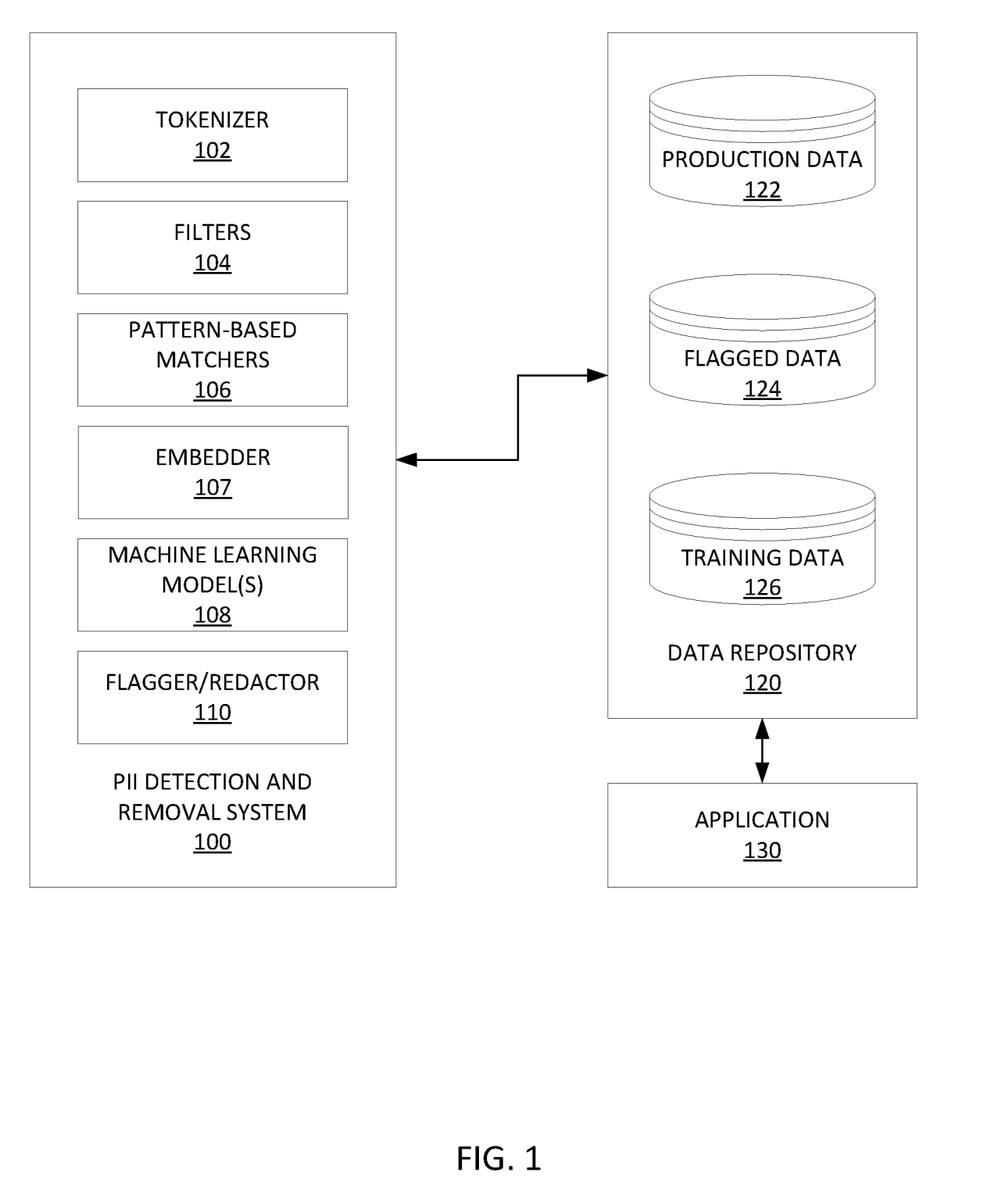
FIG. 1 depicts an example of a machine-learning based PII detection and removal system.

FIG. 1 depicts an example of a machine-learning based PII detection and removal system 100 in data communication with a data repository 120, which in-turn is in data communication with an application 130.

In this embodiment, PII system 100 includes tokenizer 102, which may create individual tokens for text data elements, such as text strings, specific words, portions of words, phrases, and the like. Generally, a token may be an index or randomly assigned string of characters that refers to a specific text data element. Tokenizing may provide a more efficient and secure way to match data strings in data being analyzed by PII system 100.

In this embodiment, PII system 100 also includes filters 104. Filters 104 may generally be applied to data from to remove, for example, any text data elements that are not considered important for PII analysis. For example, punctuation may not have predictive value for identifying PII and thus may be filtered out to reduce the amount of data to be processed when training a PII detection model.

Filters 104 may also remove known insignificant strings, words, portions of words, phrases, or tokens. For example, certain propositions, articles, and other known non-PII text (which may be represented by a token) may be removed. In some cases, a term removal dictionary (e.g., a dictionary of insignificant terms or tokens) is used to filter insignificant data before further analysis.

Filtering data from data repository 120 before further analyzing the data reduces the amount of data analyzed, which in-turn speeds up the analysis and beneficially reduces the resources burden, such as by reducing processing cycles and memory usage.

In this embodiment, PII detection system 100 also includes pattern-based matchers 106, which may match known patterns for PII. For example, social security numbers, credit card numbers, passport numbers, and other known PII patterns may be detected in data repository 120 using pattern-based matchers 106.

In some cases, pattern-based matchers 106 may be used to create training data for machine learning model(s) 108. The pattern-based matchers 106 may be based on regular expressions and/or dictionaries.

In some cases, PII detection may be done in stages with a first stage done based on pattern-based matchers 106, which are very efficient in term of processing resources, and then a second stage done based on machine learning model(s) 108, which are more expensive in terms of processing resources, but which also have significantly better PII detection capabilities, as discussed herein.

In this embodiment, PII detection system 100 also includes embedder 107. In some embodiments, an embedder such as GloVe, Fast-Text, or word2vec may be used to embed input data into one or more vectors that can then be processed by the machine learning model. In some embodiments, embedder 107 may be learned during the training process if sufficient data is available.

In this embodiment, PII detection system 100 also includes one or more machine learning model(s) 108. For example, machine learning model(s) 108 may include BiLSTM neural network models and/or other recurrent neural network models.

Figure 2:
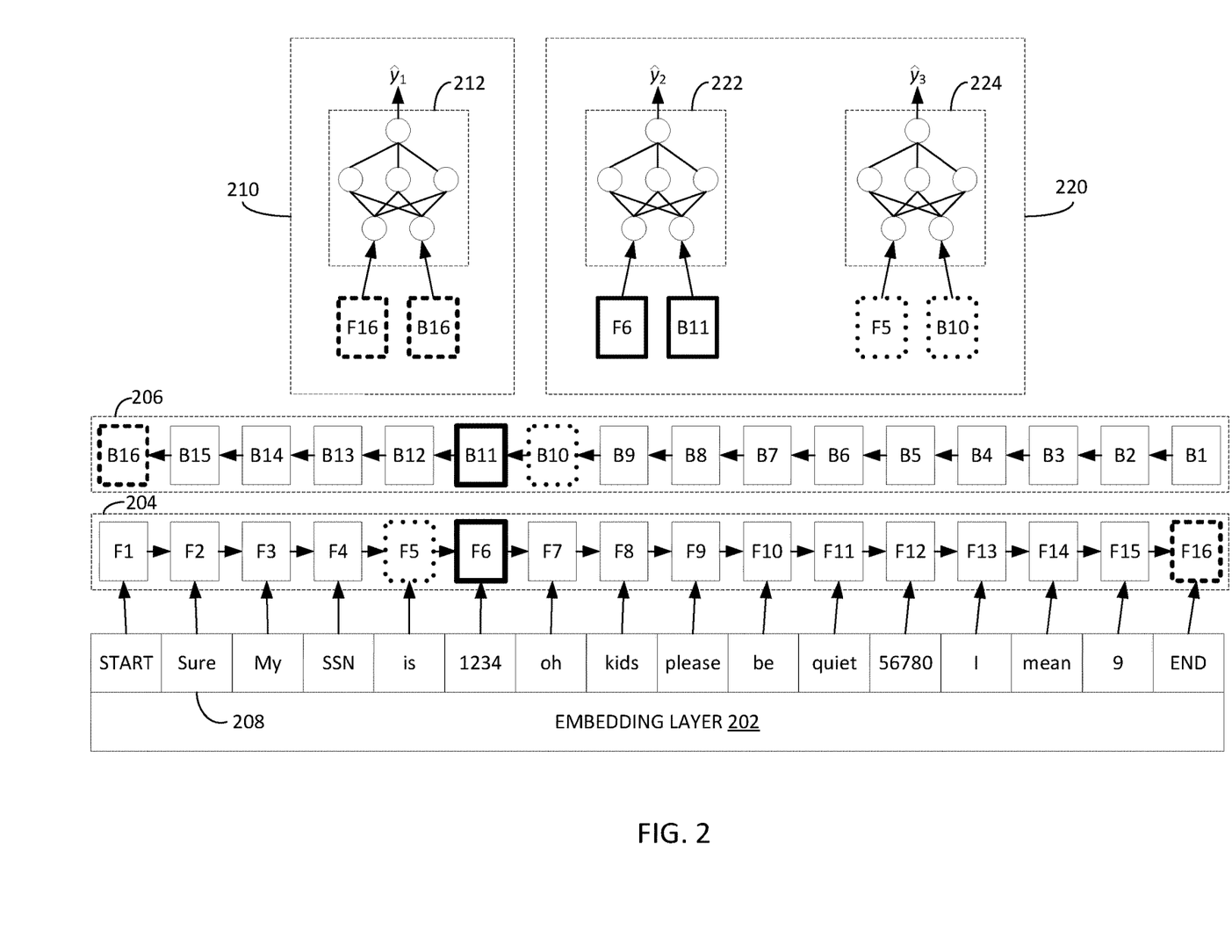
FIG. 2 depicts an example of processing text data with a BiLSTM neural network model configured for PII detection.

Machine learning model(s) 108 may be trained based on data stored in data repository 120. For example, supervised learning methods may be applied to training data collection 126 to generate BiLSTM neural network models for detecting PII in production data 122. FIG. 2 describes in further detail an example of a BiLSTM neural network model.

In this embodiment, PII detection system 100 also includes flagger/redactor 110, which is configured to redact and/or flag text data elements, such as terms or tokens, that are predicted to be PII by machine learning model(s) 108. In some cases, redaction may involve simply deleting the predicted PII text, while in other cases, the predicted PII text may be replaced with placeholder text to maintain some context/readability in the text strings. When the predicted PII text is flagged, it may be indicated as such in the text string by specific formatting so that a reviewer can easily review and determine whether the flagged text is indeed PII.

In this embodiment, data repository 120 includes a plurality of data collections (i.e., datasets), including production data collection 122, flagged data collection 124, and training data collection 126. Each data collection may be stored, for example, in a database or other data structure.

In this example, production data collection 122 includes data that is actively used in support of applications and services (e.g., web-based application services), such as application 130. Note that while only one application (130) is depicted in FIG. 1, many applications may be configured to interact with (e.g., store data in and retrieve data from) production data collection 122.

Flagged data collection 124 comprises data that has been flagged by PII detection system 100 as PII. In some embodiments, PII system 100 may be configured to operate in a semi-automated fashion where PII that is detected via machine learning model(s) 108 is flagged for verification and deletion by a human operator. In this way, additional training data may be generated and stored in training data collection 126 because the verification by a human operator provides a "label" for the detected PII that may be used to further refine existing machine learning models or to generate new machine learning models for PII system 100. In some cases, PII system 100 may "run-in" one or more new machine learning model(s) 108 using flagged data and human verification for a period of time and then switch to a fully automated mode where flagged data is no longer used. In embodiments where PII system 100 runs in a fully automated fashion, flagged data collection 124 may not be necessary.

Training data collection 126 comprises data for training machine learning model(s) 108. For example, consistent with the discussion above with respect to Tables 2-4, training data collection 126 may include text-based transcripts of support sessions with users of application 130 (or other applications), which have been labeled based on the presence of PII and/or whether PII has been redacted. As above, this is one example of training data, and many others are possible.

Note that while shown as a single data repository 120 with multiple data collections (e.g., 122, 124, and 126) in FIG. 1, each data collection could be in a different data repository, or even broken across various data repositories, including cloud-based data repositories. Further, the separation of different types of data (e.g., production vs. training) into different data collections is also exemplary. In other embodiments, one or more of the data collections depicted in FIG. 1 could be combined into a single data collection. In such cases, the data may be separable by attributes stored in each data record.

Application 130 may be any sort of application, such as a desktop application, web-based application, mobile device application, and the like. Application 130 may use and create production data that is stored in and accessed from production data collection 122. In some examples, application 130 may be a personal finance application or a tax preparation application.

Note that while FIG. 1 does not depict any specific network or networks, one or more networks, such as local area networks (LANs), wide area networks (WANs), and the like, may connect PII detection system 100 with data repository 120, and likewise data repository 120 to application 130.

Example BiLSTM Neural Network Model Processing

FIG. 2 depicts an example of processing text data with a BiLSTM neural network model configured for PII detection.

Initially, a text string, such as "Sure. My SSN is 1234 oh kids please be quiet 56780 I mean 9" may be filtered (e.g., by filters 104 in FIG. 1) to remove punctuation and then sent to an embedding layer as, for example, a vector or tensor input. For example, embeddings such as GloVe, Fast-Text, and word2vec may be used to embed the text string into one or more vectors that can then be processed by the machine learning model. In some embodiments, emeddings may be learned during the training process if sufficient data is available.

Once embedded, each individual text data element, e.g., 208, may be considered by the BiLSTM neural network model as part of a forward pass 204 and backward pass 206 through the text string. As depicted, the state of the BiLSTM neural network model changes at each stage of the forward pass (F1 through F16) and again at each stage of the backward pass (B1 through B16) as the text string is considered. Note that each stage of the forward pass (F1 through F16) and backward pass (B1 through B16) is associated with an intermediate vector, which may be used as input to a further neural network model, such as 212, 222, and 224.

A subset of the states of the BiLSTM neural network model(s) (e.g., F1 through F16 and B1 through B16) may be used for generating a multi-faceted prediction, as described above. For example, states F16 and B16, which represent (e.g., through intermediate vectors) the ending state after the forward pass 204 and the backward pass 206, respectively, may be used as input for the BiLSTM neural network model 212 to get an output "$\hat{y}_1$", which may be used to determine whether or not the text string includes PII as part of determination block 210. For example, this output $y_1$ may take the form of a probability, which may be compared to a threshold to make the determination.

Further, states F6 and B11, which represent (e.g., through intermediate vectors) the state of the BiLSTM neural network with respect to a specific text data element, here "1234", may be used as input for the BiLSTM neural network model 222 to get an output "$\hat{y}_2$" related to whether or not the specific text data element "1234" is PII. Similarly, states F5 and B10, which represent the states of the BiLSTM neural network immediately before (F5) and immediately after (B10) the specific text data element (F6/B11), may be used as input for the BiLSTM neural network model 224 to get an output "$\hat{y}_3$" related to whether or not the specific text data element "1234" is PII.

Notably, the before and after states F5 and B10 provide context to the determination of whether the specific text data element "1234" is PII. Further, note that these states represent the state of the BiLSTM model after considering everything up to "1234" from each direction, not merely the preceding and following text data elements. In other words, state F5 represents the state of the BiLSTM model after considering "Sure my SSN is" (F5) and "oh kids please be quiet 56789 I mean 9" (B10). As is clear in this example, the context provided by F5 is significant because of the inclusion of the term "SSN".

The neural network models 212, 222, and 224 may in some embodiments have the same structure, but different learned weights (e.g., $W_1$, $W_2$, and $W_3$, as below). In other embodiments, they may have different structures and different weights.

In this example, both $\hat{y}_2$ and $\hat{y}_3$ may be used to determine whether or not the specific text data element (here, "1234") is PII as part of determination block 220. For example, these outputs may take the form of probabilities in certain embodiments, which may be combined (e.g., averaged) and/or weighted before being compared to a threshold.

The independent determinations of $\hat{y}_1$, $\hat{y}_2$, and $\hat{y}_3$ may be combined into a composite loss function, which considers the contribution of each for model training. In one embodiment, a composite loss function for the over i training samples can be expressed as follows:

$$L = \Sigma_i (W_1 * CE(\hat{y}_1^i, y_1^i) + W_2 * CE(\hat{y}_2^i, y_2^i) + W_3 * CE(\hat{y}_3^i, y_3^i)) \quad \text{(Equation 1)}$$

In Equation 1, above: $\hat{y}_1^i$ is the model prediction of whether the ith training sample (e.g., a text string) includes PII; $\hat{y}_2^i$ is the model prediction of whether the ith training sample (e.g., a specific data element) is PII; and $\hat{y}_3^i$ is the model prediction of whether the ith training sample (e.g., the specific data element) is PII based on the context around the specific data element; $y_1$, $y_2$, and $y_3$ are the known labels; CE represents a cross-entropy calculation; and $W_1$, $W_2$, and $W_3$ are adjustable weights (e.g., hyperparameters). Further, $L^i$ is the loss for the ith training sample based on an input of, for example, $x_i$.

In some cases, especially where there is a significant amount of training data, training may be done in batches of data to improve processing time. In such a case, the batch loss $L_{batch}$ for the nth batch batch_n can be expressed as follows:

$$L_{batch} = \Sigma_i^{batch\_n}(W_1 * CE(\hat{y}_1^i, y_1^i) + W_2 * CE(\hat{y}_2^i, y_2^i) + W_3 * CE(\hat{y}_3^i, y_3^i)) \quad \text{(Equation 2)}$$

As discussed above, specific training strategies may be implemented with the BiLSTM neural network model strategy described with respect to FIG. 2. For example, during initial model training, weighting between the three independent predictions $\hat{y}_1$, $\hat{y}_2$, and $\hat{y}_3$ via weights $W_1$, $W_2$, and $W_3$ may be biased for better generalization to improve detection of PII from context. So, for example, $W_3$ and $W_1$ may be relatively larger than $W_2$. This biasing of the loss function L may bias the model evolution toward context-based determinations, which may tend to mitigate any over fitting with respect to the training data set.

After initial model training and once inferences are being made based on new, unseen data, the model weighting parameters may be changed to give more bias or priority to the term-level prediction. So, for example, $W_2$ may be increased relative to $W_1$ and $W_3$ to improve model performance with respect to specific contexts (e.g., specific types of production data or data related to a specific application). For example, as described above with respect to FIG. 1, flagged data may be used to further refine the model after initial training, and during this time, the weights may be reconfigured to improve performance on a specific type of production data.

Figure 3:
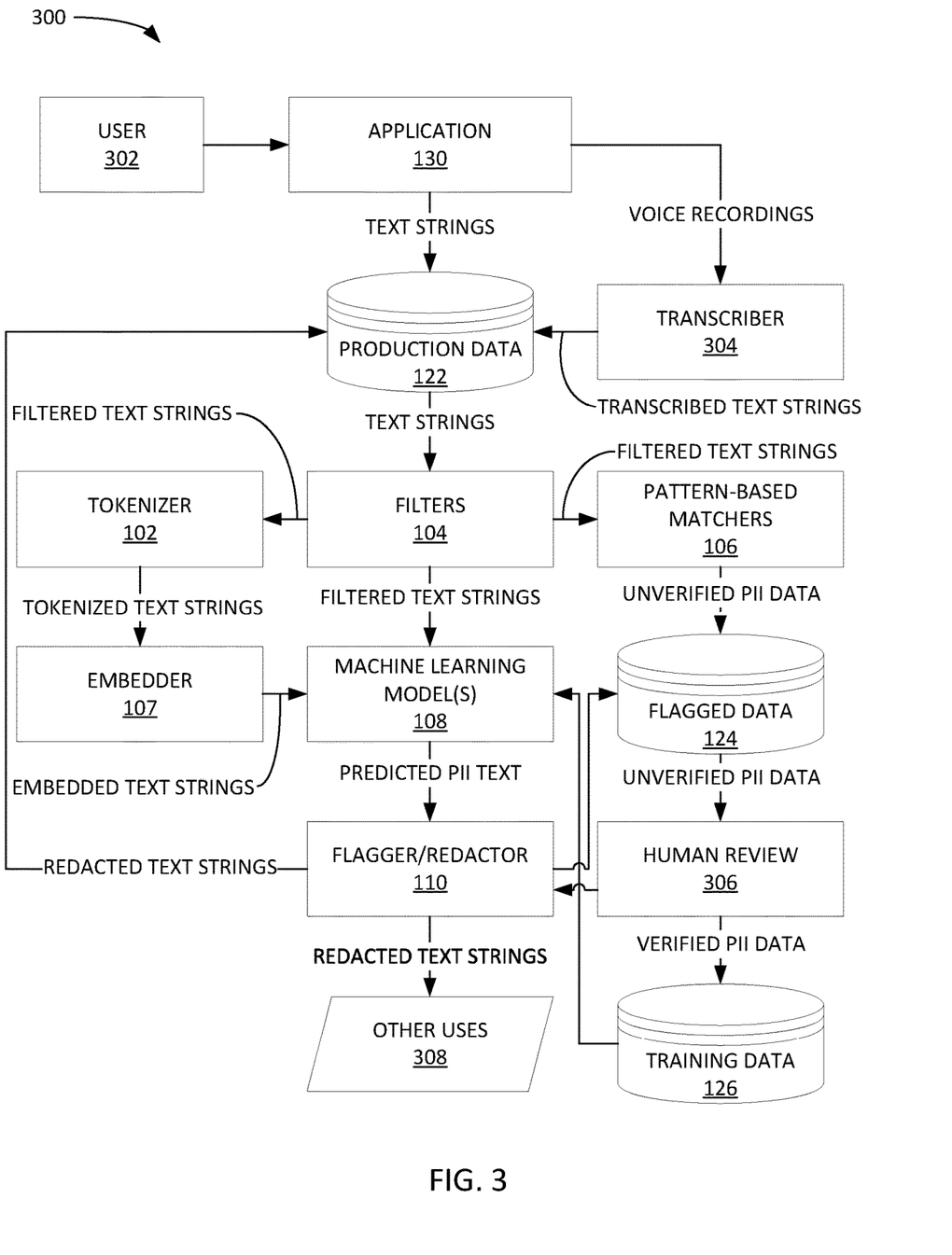
FIG. 3 depicts an example process flow for detecting and removing PII using a machine learning model.

Example Process Flow for Detecting and Removing PII Using a Machine Learning Model FIG. 3 depicts an example process flow 300 for detecting and removing PII using a machine learning model.

Process flow 300 starts at 302 where a user interacts with an application 130. As part of that interaction, user 302 may request support through, for example, a support phone call or through a text-based support session, such as a live chat. Note that while shown as going through application 130, the support session may be conducted through an independent phone service or text-based support platform.

In the case of a support phone call, a voice recording may be generated and sent to transcriber 304, which generates a text record of the phone call. The transcribed text is then sent to production data collection 122 for use by the organization. Notably, the transcribed text may be sent to other databases, systems, applications, or the like in other embodiments. FIG. 3 is just one example for discussion.

In the case of a text-based support session, the text strings (e.g., a live chat log) may be sent directly to production data collection 122.

Text strings from production data collection 122 may then be filtered by filters 104 to generate filtered text strings. For example, as discussed above, information that is not predictive of PII, such as certain punctuation, certain words, etc. may be removed to reduce the amount of data that needs processing by a PII system, such as described in FIG. 1. In other embodiments, the filtering step may be omitted.

In some embodiments, the filtered text strings may be tokenized by tokenizer 102, which generates tokenized text strings. As described above, tokenization may improve the efficiency of analysis. In other embodiments, the tokenization step may be omitted. Further, tokenized text strings may further be embedded by embedder 107.

Generally, text strings, which may be optionally filtered, tokenized, and/or embedded may be provided to one or more machine learning model(s) 108, such as BiLSTM neural network models trained to detect PII in the provided input text strings. Machine learning model(s) 108 may output predicted PII text, or likelihoods or probabilities that analyzed text data elements (e.g., terms or tokens) are PII. In some embodiments, this may be performed as described above with respect to FIG. 2.

For example, in some embodiments, multiple predictions may be generated, including predictions of PII based on one or more of: a specific term or token, a context around the specific term or token, and/or the text string including the specific term or token as a whole. In such embodiments, each prediction may be weighted and considered as part of a composite loss function, such as Equation 1, above.

In some embodiments, machine learning model(s) 108 may be trained using an initial set of weights or parameters for the one or more prediction types, and then tuned for active predicting or inferencing of new data using a second set of weights or parameters, such as described above.

The predicted PII output of machine learning model(s) 108 may be processed by flagger/redactor 110. In some cases, flagger/redactor 110 may generate redacted text strings, which are sent back to production data collection 122 to replace the un-redacted text strings that include PII. Further, the redacted text strings may be provided for other uses 308, such as training, generation of other models, further analysis, and the like.

In other cases, flagger/redactor 110 may provide text strings with flagged text data elements (e.g., terms or tokens) to flagged data collection 124 so that it may subsequently be reviewed by a human reviewer at 306. After human review, the text strings with verified PII data (as well as with verified no PII data) may be provided to training data collection 126, and the training data may subsequently be used to train or refine machine learning model(s) 108. Further, human reviewed text strings may be provided back to flagger/redactor 110 for redaction of human verified PII.

In some embodiments, flagger/redactor 110 may be further configured to redact the original voice recordings provided by application 130 based on time stamp information provided in the transcribed text strings. In other words, because the temporal position of the predicted PII within a transcribed text string may be known, the predicted PII locations in the transcribed text strings can be used as markers for removing data from the voice recordings associated with that predicted PII. In this way, all of the data provided by application 130 (including voice recordings and transcribed text strings in this example) can have the PII removed.

In some embodiments, the original text strings from production data collection 122, or filtered and/or tokenized text strings, may be provided to pattern-based matchers 106, which may flag potential PII data using, for example, regular expressions. The flagged data may then be stored in flagged data collection 126 and then reviewed by a human reviewer at 306, as described above.

Notably, flow 300 is just one example, and many other examples are possible. As described above, many steps in flow 300 are optional, such as filtering, tokenizing, pattern-matching, etc.

Example Method for Detecting and Removing PII Using Machine Learning Models

Figure 4:
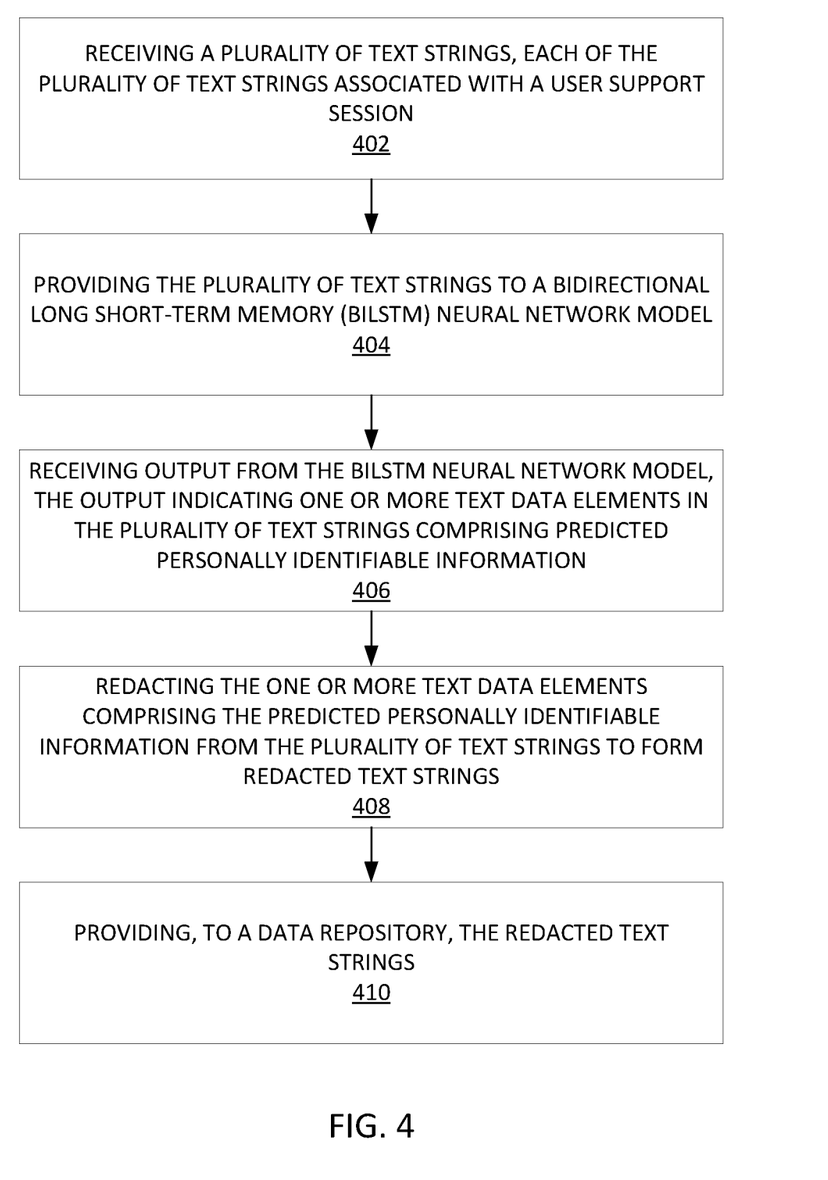
FIG. 4 depicts an example method for detecting personally identifiable information.

FIG. 4 depicts an example method 400 for detecting personally identifiable information.

Method 400 begins at step 402 with receiving a plurality of text strings, each of the plurality of text strings associated with a user support session.

In some embodiments, each text string of the plurality of text strings comprises one or more text data elements Method 400 then proceeds to step 404 with providing the plurality of text strings to a bidirectional long short-term memory (BiLSTM) neural network model.

Method 400 then proceeds to step 406 with receiving output from the BiLSTM neural network model, the output indicating one or more text data elements in the plurality of text strings comprising predicted personally identifiable information.

In some embodiments, for each respective text data element of the one or more text data elements of each respective text string of the plurality of text strings, the output from the BiLSTM neural network model comprises at least: a first prediction of whether the respective text string comprising the respective text data element comprises personally identifiable information; a second prediction of whether the respective text data element comprises personally identifiable information based on the text data element; and a third prediction of whether the respective text data element comprises PII based on a forward context and a backward context associated with the respective text data element. For example, these predictions may be the three individual predictions ($\hat{y}_1$, $\hat{y}_2$, and $\hat{y}_3$) described above with respect to FIG. 2.

In some embodiments, if the first prediction indicates that the respective text string does not comprise personally identifiable information, the second prediction and third prediction may be skipped in order to save processing power. In other embodiments, where the first prediction indicates that the respective text string does not comprise personally identifiable information, the second prediction and third prediction may still be performed, and a weighted vote between the predictions may determine whether the one or more text data elements in the plurality of text strings comprise predicted personally identifiable information.

Method 400 then proceeds to step 408 with redacting the one or more text data elements comprising the predicted personally identifiable information from the plurality of text strings to form redacted text strings.

Method 400 then proceeds to step 410 with providing, to a data repository, the redacted text strings.

In some embodiments, method 400 further comprises receiving a voice recording from an application; and transcribing the voice recording into the plurality of text strings.

In some embodiments, method 400 further comprises removing portions of the voice recording based on the redacted text strings.

In some embodiments, method 400 further comprises verifying the one or more text data elements in the plurality of text strings comprise predicted personally identifiable information, such as described above with respect to FIG. 3.

In some embodiments, method 400 further comprises generating training data based on the one or more text data elements in the plurality of text strings comprising predicted personally identifiable information, and updating the BiLSTM neural network model based on the training data, such as described above with respect to FIG. 3.

In some embodiments of method 400, updating the BiLSTM neural network model based on the training data comprises: minimizing a composite loss function, wherein the composite loss function comprises a plurality of individual loss components associated with a plurality of individual prediction components. For example, the composite loss function may be Equation 1, above, or Equation 2 when considering batches of input data.

In some embodiments, method 400 further comprises, prior to providing the plurality of text strings to the BiLSTM neural network model, filtering the plurality of text strings to remove terms based on a term removal dictionary, such as described above with respect to FIG. 3.

In some embodiments, method 400 further comprises, prior to providing the plurality of text strings to the BiLSTM neural network model, tokenizing the plurality of text strings, such as described above with respect to FIG. 3.

In some embodiments, method 400 further comprises, prior to providing the plurality of text strings to the BiLSTM neural network model, embedding the plurality of text strings using one of GloVe embedding or word2vec embedding, such as described above with respect to FIG. 3.

Example Processing System

Figure 5:
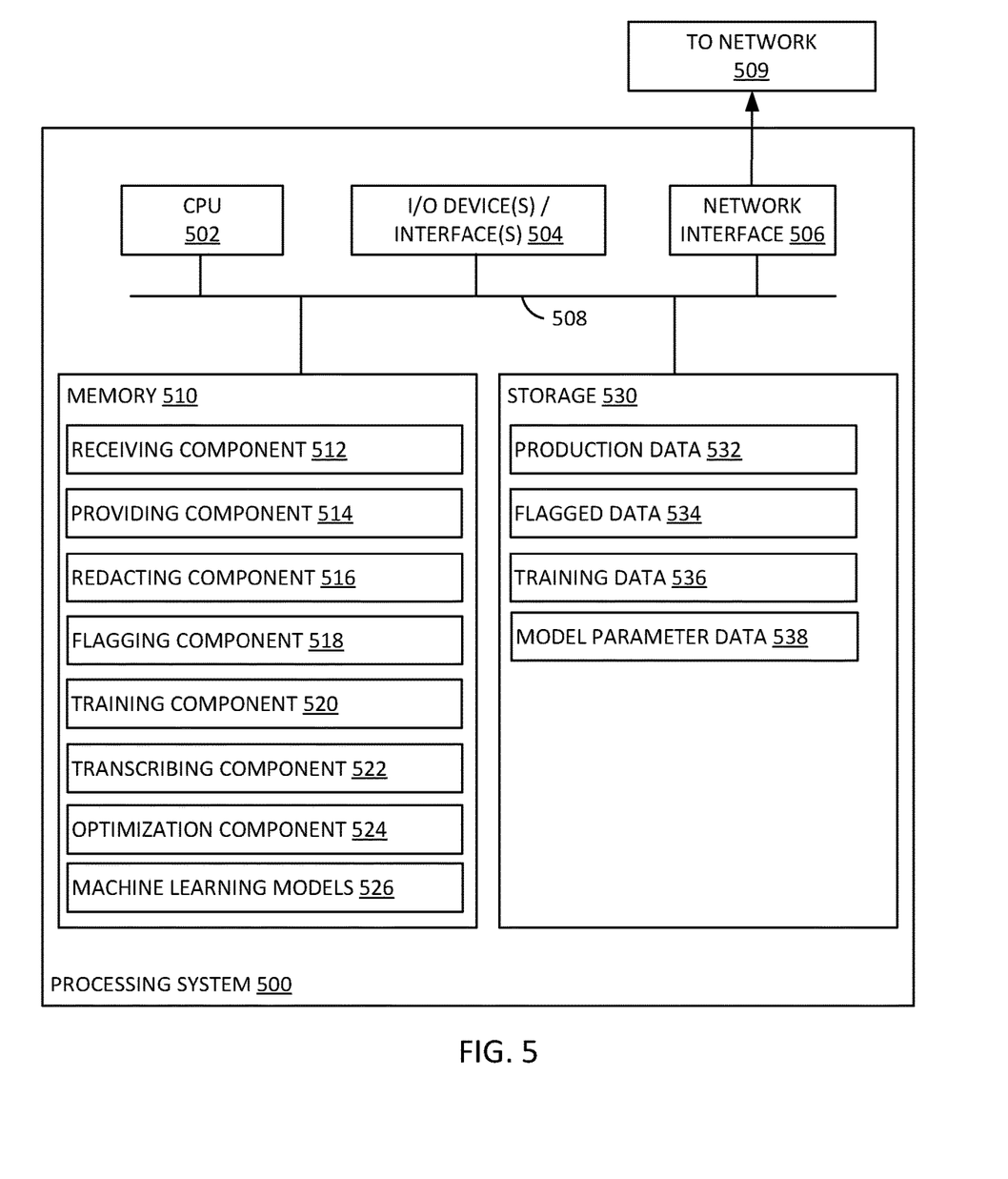
FIG. 5 depicts an exemplary processing system configured to perform methods for detecting and removing personally identifiable information.

FIG. 5 depicts an exemplary processing system 500 configured to perform methods for detecting and removing personally identifiable information.

Processing system 500 includes a CPU 502 connected to a data bus 508. CPU 502 is configured to process computer-executable instructions, e.g., stored in memory 510 or storage 530, and to cause processing system 500 to perform methods as described herein, for example with respect to FIGS. 2-4. CPU 502 is included to be representative of a single CPU, multiple CPUs, a single CPU having multiple processing cores, and other forms of processing architecture capable of executing computer-executable instructions.

Processing system 500 further includes input/output devices and interface 504, which allows processing system 500 to interface with input/output devices, such as, for example, keyboards, displays, mouse devices, pen input, touch sensitive input devices, cameras, microphones, and other devices that allow for interaction with processing system 500. Note that while not depicted with independent external I/O devices, processing system 500 may connect with external I/O devices through physical and wireless connections (e.g., an external display device).

Processing system 500 further includes network interface 506, which provides processing system 500 with access to external computing devices, such as via network 509.

Processing system 500 further includes memory 510, which in this example includes various components configured to perform the functions described herein. In this embodiments, memory 510 includes receiving component 512, providing component 514, redacting component 516, flagging component 518, training component 520, transcribing component 522, optimization component 524, and machine learning models 526. These various components may, for example, comprise computer-executable instructions configured to perform the various functions described herein.

Note that while shown as a single memory 510 in FIG. 5 for simplicity, the various aspects stored in memory 510 may be stored in different physical memories, but all accessible CPU 502 via internal data connections, such as bus 512. For example, some components of memory 510 may be locally resident on processing system 500, while others may be performed on remote processing systems or in cloud-based processing systems in other embodiments. This is just one example.

Processing system 500 further includes storage 530, which in this example includes production data 532, which may be like production data collection 122 described above with respect to FIG. 1. Storage 510 also includes flagged data 534, which may be flagged data collection 124 in FIG. 1. Storage 510 also includes training data 536, which may be like training data collection 126 in FIG. 1. Storage 510 also includes model parameters 538, such as those described above with respect to FIG. 2. While not depicted in FIG. 5, other aspects may be included in storage 530.

As with memory 510, a single storage 530 is depicted in FIG. 5 for simplicity, but the various aspects stored in storage 530 may be stored in different physical storages, but all accessible to CPU 502 via internal data connections, such as bus 508, or external connection, such as network interface 506.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting personally identifiable information, comprising:
   receiving a plurality of text strings, each text string of the plurality of text strings associated with a user support session;
   providing the plurality of text strings to one or more bidirectional long short-term memory (BiLSTM) neural network models;
   receiving output from the one or more BiLSTM neural network models, the output indicating one or more text data elements in the plurality of text strings comprising predicted personally identifiable information;

redacting the one or more text data elements comprising the predicted personally identifiable information from the plurality of text strings to form redacted text strings; and providing, to a data repository, the redacted text strings.

2. The method of claim 1, wherein:

each text string of the plurality of text strings comprises one or more text data elements, for each respective text data element of the one or more text data elements of each respective text string of the plurality of text strings, the output from the one or more BiLSTM neural network models comprises at least:
 a first prediction of whether the respective text string comprising the respective text data element comprises personally identifiable information;
 a second prediction of whether the respective text data element comprises personally identifiable information based on the respective text data element; and
 a third prediction of whether the respective text data element comprises PII based on a forward context and a backward context associated with the respective text data element.

3. The method of claim 1, further comprising:

receiving a voice recording from an application; and
transcribing the voice recording into the plurality of text strings.

4. The method of claim 3, further comprising: removing portions of the voice recording based on the redacted text strings.

5. The method of claim 1, further comprising:

verifying that the one or more text data elements in the plurality of text strings comprise predicted personally identifiable information;
generating training data based on the one or more text data elements in the plurality of text strings comprising predicted personally identifiable information; and
updating the one or more BiLSTM neural network models based on the training data.

6. The method of claim 5, wherein updating the one or more BiLSTM neural network models based on the training data comprises:

minimizing a composite loss function,
wherein the composite loss function comprises a plurality of individual loss components associated with a plurality of individual prediction components.

7. The method of claim 6, wherein the composite loss function is $L=\Sigma_i(W_1*CE(\hat{y}_1^i,y_1^i)+W_2*CE(\hat{y}_2^i,y_2^i)+W_3*CE(\hat{y}_3^i,y_3^i))$.

8. The method of claim 1, further comprising: prior to providing the plurality of text strings to the one or more BiLSTM neural network models, filtering the plurality of text strings to remove terms based on a term removal dictionary.

9. The method of claim 1, further comprising: prior to providing the plurality of text strings to the one or more BiLSTM neural network models, tokenizing the plurality of text strings.

10. The method of claim 1, further comprising: prior to providing the plurality of text strings to the one or more BiLSTM neural network models, embedding the plurality of text strings using one of GloVe embedding or word2vec embedding.

11. A processing system, comprising:

a memory comprising computer-executable instructions;
a processor configured to execute the computer-executable instructions and cause the processing system to:
 receive a plurality of text strings, each text string of the plurality of text strings associated with a user support session;
 provide the plurality of text strings to one or more bidirectional long short-term memory (BiLSTM) neural network models;
 receive output from the one or more BiLSTM neural network models, the output indicating one or more text data elements in the plurality of text strings comprising predicted personally identifiable information;
 redact the one or more text data elements comprising the predicted personally identifiable information from the plurality of text strings to form redacted text strings; and
 provide, to a data repository, the redacted text strings.

12. The processing system of claim 11, wherein:

each text string of the plurality of text strings comprises one or more text data elements, for each respective text data element of the one or more text data elements of each respective text string of the plurality of text strings, the output from the one or more BiLSTM neural network models comprises at least:
 a first prediction of whether the respective text string comprising the respective text data element comprises personally identifiable information;
 a second prediction of whether the respective text data element comprises personally identifiable information based on the respective text data element; and
 a third prediction of whether the respective text data element comprises PII based on a forward context and a backward context associated with the respective text data element.

13. The processing system of claim 11, wherein the processor is further configured to cause the processing system to:

receive a voice recording from an application; and
transcribe the voice recording into the plurality of text strings.

14. The processing system of claim 13, wherein the processor is further configured to cause the processing system to: remove portions of the voice recording based on the redacted text strings.

15. The processing system of claim 11, wherein the processor is further configured to cause the processing system to:

verify that the one or more text data elements in the plurality of text strings comprise predicted personally identifiable information;
generate training data based on the one or more text data elements in the plurality of text strings comprising predicted personally identifiable information; and
update the one or more BiLSTM neural network models based on the training data.

16. The processing system of claim 15, wherein in order to update the one or more BiLSTM neural network models based on the training data, the processor is further configured to cause the processing system to:

minimize a composite loss function,
wherein the composite loss function comprises a plurality of individual loss components associated with a plurality of individual prediction components.

17. The processing system of claim 16, wherein the composite loss function is $L=\Sigma_i(W_1*CE(\hat{y}_1^i,y_1^i)+W_2*CE(\hat{y}_2^i,y_2^i)+W_3*CE(\hat{y}_3^i,y_3^i))$.

18. A non-transitory computer-readable medium comprising computer-executable instructions, which, when executed by a processing system, cause the processing system to perform a method for detecting personally identifiable information, the method comprising:
- receiving a plurality of text strings, each text string of the plurality of text strings associated with a user support session;
- providing the plurality of text strings to one or more bidirectional long short-term memory (BiLSTM) neural network models;
- receiving output from the one or more BiLSTM neural network models, the output indicating one or more text data elements in the plurality of text strings comprising predicted personally identifiable information;
- redacting the one or more text data elements comprising the predicted personally identifiable information from the plurality of text strings to form redacted text strings; and
- providing, to a data repository, the redacted text strings.

19. The non-transitory computer-readable medium of claim 18, wherein:
- each text string of the plurality of text strings comprises one or more text data elements,
- for each respective text data element of the one or more text data elements of each respective text string of the plurality of text strings, the output from the one or more BiLSTM neural network models comprises at least:
  - a first prediction of whether the respective text string comprising the respective text data element comprises personally identifiable information;
  - a second prediction of whether the respective text data element comprises personally identifiable information based on the respective text data element; and
  - a third prediction of whether the respective text data element comprises PII based on a forward context and a backward context associated with the respective text data element.

20. The non-transitory computer-readable medium of claim 18, wherein the method further comprises:
- verifying that the one or more text data elements in the plurality of text strings comprise predicted personally identifiable information;
- generating training data based on the one or more text data elements in the plurality of text strings comprising predicted personally identifiable information; and
- updating the one or more BiLSTM neural network models based on the training data by:
  - minimizing a composite loss function,
  - wherein the composite loss function comprises a plurality of individual loss components associated with a plurality of individual prediction components.

* * * * *